United States Patent
Xiao

(10) Patent No.: US 7,549,347 B2
(45) Date of Patent: Jun. 23, 2009

(54) MULTIPLE DIFFERENTIAL VOLUME TUBE MEASUREMENT QUANTITATIVE CONVEYING DEVICE AND ITS CONVEYING METHOD THEREOF

(75) Inventor: Cong Xiao, 4/F, East Section, Tairan Gongmao Building, Tairan Gongmao Yuan, Futian District, Shenzhen, Guangdong (CN) 518000

(73) Assignee: Cong Xiao, Guangdong (CN)

( * ) Notice: Subject to any disclaimer, the term of this patent is extended or adjusted under 35 U.S.C. 154(b) by 339 days.

(21) Appl. No.: 10/588,743

(22) PCT Filed: Jan. 12, 2005

(86) PCT No.: PCT/CN2005/000040
§ 371 (c)(1),
(2), (4) Date: Aug. 7, 2006

(87) PCT Pub. No.: WO2005/078396
PCT Pub. Date: Aug. 25, 2005

(65) Prior Publication Data
US 2007/0157723 A1    Jul. 12, 2007

(30) Foreign Application Priority Data
Feb. 6, 2004 (CN) .................. 2004 1 0015302

(51) Int. Cl.
*G01F 1/34* (2006.01)
(52) U.S. Cl. ...................... 73/861.42; 73/861
(58) Field of Classification Search .............. 73/714, 73/861, 243
See application file for complete search history.

(56) References Cited

U.S. PATENT DOCUMENTS

| 4,747,307 | A | 5/1988 | Humberstone |
| 5,669,839 | A | 9/1997 | Graf et al. |
| 5,975,374 | A | 11/1999 | Vargas et al. |
| 6,360,579 | B1 | 3/2002 | De Boom et al. |

FOREIGN PATENT DOCUMENTS

| DE | 10136904 | 2/2003 |
| GB | 2126193 | 3/1984 |

*Primary Examiner*—Andre J Allen
(74) *Attorney, Agent, or Firm*—The Webb Law Firm

(57) ABSTRACT

This invention discloses a multiple differential volume tube measurement quantity conveying device and its conveying method thereof. The device includes volume tubes, inlet pipes and outlet pipes, in which there are at least two set of volume tubes divided into two groups. The inlet pipe of the volume tube is connected with a main inlet pipe and the outlet pipe of the volume tube is connected with a main outlet pipe. Drive mechanisms to be arranged to drive the volume tubes respectively. The drive mechanism is connected with a controller in complementary manner at the same time. The first step of conveying method is to confirm the conveying state of any referenced volume tube group. The second step is to decide the compensatory conveying volume and the conveying volume of the referenced volume tube groups. This invention improves the technical performance of the measurement and quantitative conveying of a volume tube device, measurement conveying pump and volume tube measurement conveying pump, in which the fluid flows smoothly and continuously.

6 Claims, 3 Drawing Sheets

| Working process | Phase relation of devices A and B in an action cycle | | | | | | | |
| --- | --- | --- | --- | --- | --- | --- | --- | --- |
| | Forward stroke of piston | | | | Backward stroke of piston | | | |
| | Stage 1 | Stage 2 | Stage 3 | Stage 4 | Stage 5 | Stage 6 | Stage 7 | Stage 8 |
| Conveying state of device A | uniform speed | decelerated motion | idle state | accelerated motion | uniform speed | decelerated motion | idle state | accelerated motion |
| Conveying state of device B | idle state | accelerated motion | uniform speed | decelerated motion | idle state | accelerated motion | uniform speed | decelerated motion |

FIGURE 3

MULTIPLE DIFFERENTIAL VOLUME TUBE MEASUREMENT QUANTITATIVE CONVEYING DEVICE AND ITS CONVEYING METHOD THEREOF

BACKGROUND OF THE INVENTION

This invention relates to a differential operation mode of paralleling multiple metrology-type conveying pumps of volume tube, especially relates to a standard device that is used to measure the definite-quantity output of fluid medium and the fluid medium flow, to demarcate the container volume and to calibrate the measurement instruments and devices of the fluid medium flux.

The well-known volume tube devices, measurement conveying pump devices and measurement conveying pump devices of volume tube are often operated in single operation mode. Even if multiple paralleling operation is used, it is only a matter of aiming at increasing the delivery quantity and measuring the fluid medium flux. Thus the smooth and continuous measurement output cannot be reached. A differential operation mode of paralleling multiple differential volume tube measurement conveying pumps is used in this invention. As a result, not only the purpose of increasing the conveying quantity and measuring the fluid medium flux is reached, but also the accurate infinitude demarcation for gross volume, the stabile and non-pulsating quantitative fluid convey and the arbitrary flow adjustment are thus realized since the output volume speed of each device is controlled by computer at the same time.

BRIEF SUMMARY OF THE INVENTION

The purpose of this invention is to provide an operation mode for volume tube device, measurement conveying pump device and measurement conveying pump device of volume tube, so as to overcome the shortage that the known volume tube device, measurement conveying pump device and measurement conveying pump device of volume tube cannot ensure a smooth and continuous measurement and a quantitative convey of fluid medium, and to improve the technical performance of the quantitative conveying fluid medium and the stabile and continuous measurement for the volume tube device, measurement conveying pump device and measurement conveying pump device of volume tube.

The purpose of this invention can be realized by using the following technical measures:

Using a multiple differential volume tube measurement quantity conveying device. The device includes volume tubes, inlet pipes and outlet pipes. Specially, there are at least two set of the mentioned volume tubes, divided into at least two groups. The inlet pipe of each group volume pipe mentioned above is connected with a main inlet pipe, and the outlet pipe of each group volume pipe mentioned above is connected with a main outlet pipe. A drive mechanism is set for separately driving each group volume tube mentioned above, and the said drive mechanism is simultaneously connected with a controller in complementary manner.

A conveying method with a multiple differential volume tube measurement quantity conveying device is also provided. In which, in the measurement quantity conveying device connecting with multiple sets of the volume tubes, a chief control computer is set for controlling the drive capability/delivery capacity. The method characterizes in: this method includes the following procedures: A, confirming the conveying state of any referenced tube group; B, deciding the compensatory conveying volume and the conveying state of the other volume tube groups according to the difference between the predetermined conveying volume and the conveying volume of the referenced volume tube groups.

BRIEF DESCRIPTION OF THE DRAWINGS

FIG. 3 is a movement phase relation table of volume tube piston in a cycle period.

DETAILED DESCRIPTION OF THE INVENTION

Figure 1:
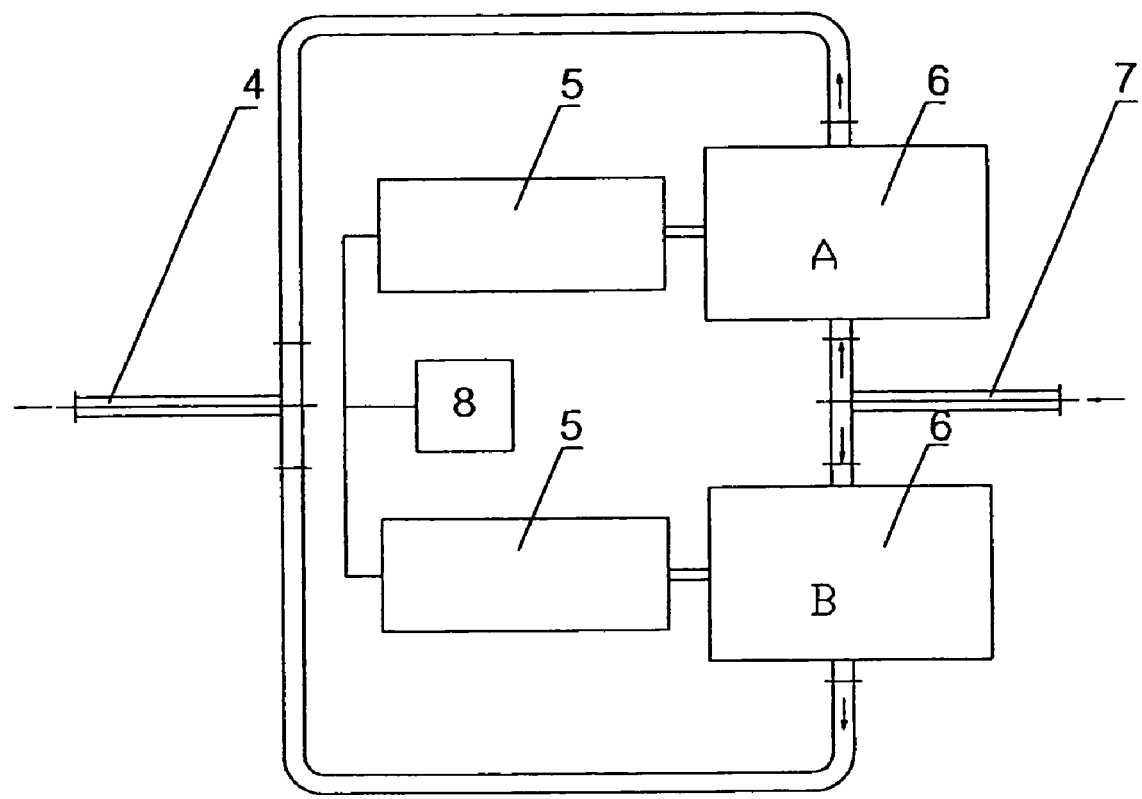
FIG. 1 is a general structure view of a multiple differential volume tube measurement quantitative conveying device and its conveying method of this invention.

Combined with the attached drawings, the embodiments of this invention are described as follows:

This invention provides a multiple differential volume tube measurement quantitative conveying device, including volume tube 6, inlet pipe and outlet pipe. Characterizing in:

There are at least two pieces of the mentioned volume tubes 6, divided into at least two groups;

The inlet pipe of each volume tube group is connected with a main inlet pipe 7;

The outlet pipe of each volume tube group is connected with a main outlet pipe 4;

A drive mechanism 5 is set for separately driving each volume tube group.

The mentioned drive mechanism 5 is simultaneously connected with a controller in complementary manner.

The controller mentioned is a computer 8 operated through differential method.

In a series-parallel connection embodiment, there are four pieces of volume tubes 6, where two pieces in each group are connected in series, and paralleling is connected among the different groups.

In an unmixed parallel connection embodiment, there are four pieces of volume tubes 3, paralleling is connected at each fluid inlet and outlet, respectively.

This invention also provides a combined differential metrology-type quantitative delivery method of volume tube. In a measurement delivery device connecting multiple pieces of volume tubes of each group, a chief control computer is set for controlling the drive capability/delivery capacity, with such character: this method includes the following procedures:

A, select one group of volume tube as reference group, and then determine the delivery state of the reference group;

B, referring to difference between the general preset delivery quantity and the delivery quantity of reference volume group determines the compensation delivery quantity and delivery state of the other volume tube groups.

The mentioned delivery state can be divided into uniform speed, uniform acceleration or uniform deceleration.

A differential operation method paralleling multiple metrology-type delivery pumps of volume tube is involved with a combined operation method of volume tube and measurement delivery device, especially involved with a standard device that is used to measure the definite-quantity output of fluid medium and the fluid medium flow, to demarcate the container volume and to calibrate the measurement instruments and devices of the fluid medium flow. The device is composed of two or more pieces of volume tube measurement delivery pump devices; a computer is used to control the output volume speed of each device, and a differential complementation is realized to obtain a stabile flow output. The innovative point is: the accurate infinitude volume measurement and the quantitative volume delivery are available through such operation method, also the stabile and non-pulsating fluid delivery and arbitrary flow adjustment.

A differential operation method paralleling multiple pieces of volume tube metrology-type delivery pumps, with such character: the device is composed of two or more pieces of volume tube measurement delivery pumps, and optional two pieces or multiple pieces of the pumps in each device use the differential operation.

A measurement delivery pump device of double piston volume tube uses a paralleling complementary operation method whose operational phase difference is 180 degree, i.e., after starting, when device A conducts uniform motion, the piston of device B keeps at idle state; when the piston of device A turns the uniform motion into the decelerated motion, the piston of device B synchronistically turns idle state into accelerated motion; when the piston of device A turns accelerated motion into idle state, the piston of device B synchronistically turns accelerated motion into uniform motion. When the piston of device B completes uniform motion and turns into decelerated motion, the piston of device A synchronistically turns idle state into accelerated motion again, and such cycle is formed. The moving phase relation of the volume tube piston in a cycle is shown in FIG. 3.

The main body of this design is composed of power and driving device 5 and volume tube or measurement delivery pump device 6; main bodies A, B of two designs are installed in parallel, and their fluid inlet and outlet pipes are connected with main fluid inlet pipe 7 and main fluid outlet pipe 4, as shown in FIG. 1.

Figure 2:
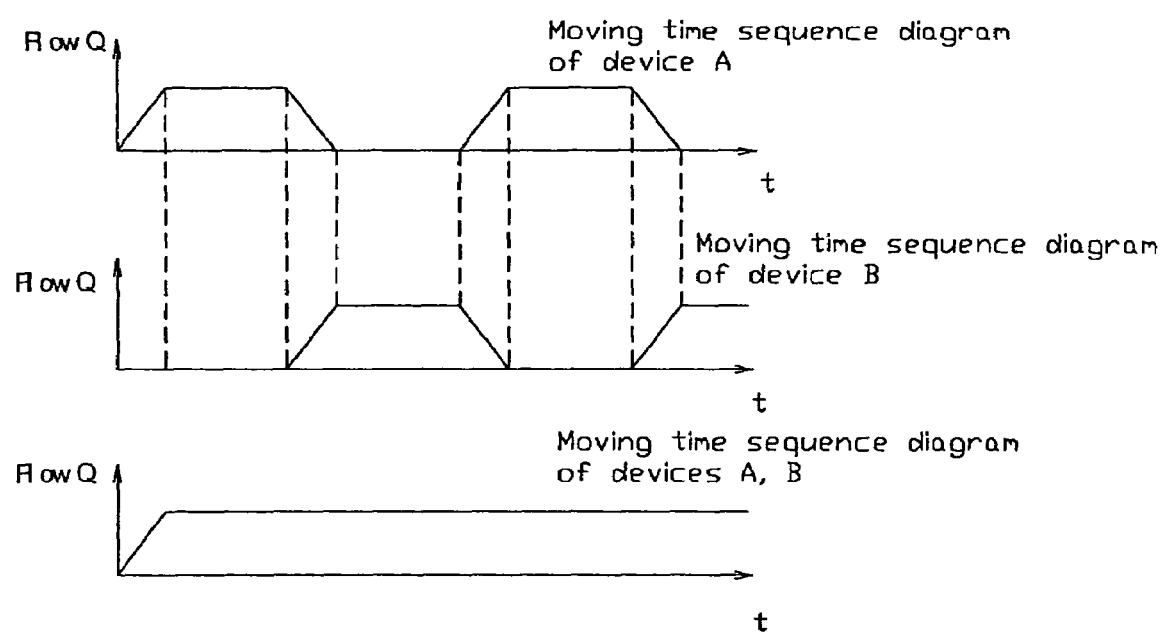
FIG. 2 is a time sequence diagram of differential operation of double volume tube.

The main bodies A, B of two designs are controlled by the control system and operated by a differential operation method of paralleling complementation, whose moving phase difference is 180 degree, and whose operational time sequence is shown in FIG. 2.

I claim:

1. A multiple differential volume tube measurement quantitative conveying device which includes volume tubes, inlet pipes and outlet pipes, wherein,
   there are at least two pieces of the volume tubes, divided into at least two groups;
   the inlet pipe of each group volume tube is connected with a main inlet pipe;
   the outlet pipe of each group volume tube is connected with a main outlet pipe;
   a drive mechanism is set for separately driving each volume tube group; and
   the drive mechanism is simultaneously connected with a controller operated in complementary manner.

2. The conveying device of claim 1, wherein the controller is a computer operated in differential manner.

3. The conveying device of claim 2, including four pieces of volume tubes, divided into two groups, wherein two pieces of volume tubes in each group are connected in series, and the two groups are connected in parallel.

4. The conveying device of claim 2, including four pieces of volume tubes which are connected in parallel at each fluid inlet and outlet, respectively.

5. A conveying method with a multiple differential volume tube measurement quantity conveying device, in which multiple pieces of volume tubes are connected in groups, and a chief control computer is set for controlling the drive capability/delivery capacity, said method including the steps of:
   A) confirming the conveying state of any referenced tube group; and
   B) determining the compensatory conveying volume and the conveying state of the other volume tube groups according to a difference between the predetermined conveying volume and the conveying volume of the referenced volume tube groups.

6. The conveying method of claim 5, wherein the conveying state includes uniform speed, uniform acceleration or uniform deceleration.

* * * * *

UNITED STATES PATENT AND TRADEMARK OFFICE
CERTIFICATE OF CORRECTION

PATENT NO. : 7,549,347 B2  Page 1 of 1
APPLICATION NO. : 10/588743
DATED : June 23, 2009
INVENTOR(S) : Xiao It is certified that error appears in the above-identified patent and that said Letters Patent is hereby corrected as shown below:

Column 4, Line 14, "controller operated in" should read
-- controller which controls the drive mechanism to drive the volume tubes to convey fluid in --

Signed and Sealed this

Twenty-ninth Day of September, 2009

David J. Kappos
*Director of the United States Patent and Trademark Office*